United States Patent
Ishimaru et al.

(10) Patent No.: US 12,116,480 B2
(45) Date of Patent: Oct. 15, 2024

(54) HEAT-SHRINKABLE POLYESTER-BASED FILM

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 978 days.

(21) Appl. No.: 17/041,999

(22) PCT Filed: Mar. 14, 2019

(86) PCT No.: PCT/JP2019/010511
§ 371 (c)(1),
(2) Date: Sep. 25, 2020

(87) PCT Pub. No.: WO2019/188337
PCT Pub. Date: Oct. 3, 2019

(65) Prior Publication Data
US 2021/0246301 A1    Aug. 12, 2021

(30) Foreign Application Priority Data

Mar. 30, 2018  (JP) ................. 2018-066740

(51) Int. Cl.
*C08L 67/02* (2006.01)
*B29C 55/08* (2006.01)
*B29C 61/02* (2006.01)
*B29K 67/00* (2006.01)

(52) U.S. Cl.
CPC .............. *C08L 67/02* (2013.01); *B29C 55/08* (2013.01); *B29C 61/02* (2013.01); *B29K 2067/003* (2013.01); *B29K 2995/0049* (2013.01); *B32B 2307/30* (2013.01); *B32B 2307/736* (2013.01); *C08L 2203/16* (2013.01)

(58) Field of Classification Search
CPC .............. B29C 55/08; B29C 61/02; B29K 2067/003; B29K 2995/0049; B29K 2307/30; B29K 2307/736; C08L 2203/16; C08L 67/02
See application file for complete search history.

(56) References Cited

U.S. PATENT DOCUMENTS

2005/0010018 A1  1/2005  Kim et al.
2013/0034673 A1* 2/2013  Haruta .................. B29C 55/143
                                              264/237
2015/0218308 A1  8/2015  Haruta et al.
2016/0347920 A1  12/2016 Inoue et al.
2020/0207934 A1  7/2020  Inoue et al.

FOREIGN PATENT DOCUMENTS

| JP | H05-169535 A | 7/1993 |
| JP | H08-027260 A | 1/1996 |
| JP | 2010-089416 A | 4/2010 |
| WO | WO 2015/118968 A1 | 8/2015 |
| WO | WO 2017/029999 A1 | 2/2017 |

OTHER PUBLICATIONS

China National Intellectual Property Administration, Office Action in Chinese Patent Application No. 201980023231.5 (Jul. 13, 2022).
European Patent Office, Extended European Search Report in European Patent Application No. 19778412.7 (Nov. 26, 2021).
Kikutani, "Sen'i kouzou no keiseikikou to kouseinou Sen'i no kaihatsu (Formation mechanism of fiber structure and development of high performance fibers)", *Sen'i Gakkaishi* (*Sen'i To Kogyo*), 63(12): p. 417-p. 422 (2007).
Mahendrasingam et al., "Effect of draw ratio and temperature on the strain-induced crystallization of poly (ethylene terephthalate) at fast draw rates," *Polymer*, 40(20): 5553-5565 (1999).
Japanese Patent Office, International Search Report in International Patent Application No. PCT/JP2019/010511 (Jun. 18, 2019).
China National Intellectual Property Administration, Office Action in Chinese Patent Application No. 201980023231.5 (Jan. 20, 2023).
Indian Patent Office, Examination Report in Indian Patent Application No. 202047044455 (Feb. 7, 2022).
Korean Intellectual Property Office, Office Action in Korean Patent Application No. 10-2020-7030901 (May 16, 2024).

* cited by examiner

*Primary Examiner* — Christopher M Polley
*Assistant Examiner* — Sathavaram I Reddy
(74) *Attorney, Agent, or Firm* — Leydig, Voit & Mayer, Ltd.

(57) ABSTRACT

The invention provides a heat-shrinkable polyester-based film, where the heat-shrinkage ratio in the width direction is high and the irregularity of thickness is small. The heat-shrinkable polyester-based film of the present invention contains 90 mol % or more of ethylene terephthalate unit based on 100 mol % of whole ester unit, wherein, the heat-shrinkable polyester-based film satisfies the requirements: (1) heat-shrinkage ratio in a width direction measured by shrinking the film for 10 seconds in 90° C. hot water is 50%-75%, (2) heat-shrinkage ratio in a longitudinal direction measured by shrinking the film for 10 seconds in 90° C. hot water is −6% or more and 14% or less, (3) heat-shrinkage ratio in the longitudinal direction measured by shrinking the film for 10 seconds in 70° C. hot water is −6% or more and 6% or less, and (4) irregularity of thickness in the width direction is 1%-20%.

4 Claims, No Drawings

HEAT-SHRINKABLE POLYESTER-BASED FILM

CROSS-REFERENCE TO RELATED APPLICATIONS

This patent application is the U.S. national phase of International Patent Application No. PCT/JP2019/010511, filed Mar. 14, 2019, which claims the benefit of Japanese Patent Application No. 2018-066740, filed Mar. 30, 2018, which are incorporated by reference in their entireties herein.

TECHNICAL FIELD

The present invention relates to a heat-shrinkable polyester-based film suitable for use as a heat-shrinkable label.

BACKGROUND ART

In recent years, for label packaging that have both of protecting glass bottles or plastic bottles and displaying products, cap seals, applications such as integrated packaging, and bandings used for banding containers such as lunch boxes or the like, a stretched film made of polyvinyl chloride-based resin, polystyrene-based resin, or polyester-based resin (so-called, heat-shrinkable film) has been used. Among these heat-shrinkable films, the polyvinyl chloride-based film has a low heat resistant property, and a problem that hydrogen chloride gas is generated during incineration, which is a cause of dioxin. Further, the polystyrene-based film is inferior in solvent resistance, and requires the use of ink with a special composition for printing. In addition, it needs to be incinerated at a high temperature, and has a problem that a large amount of black smoke is generated with an awful smell during incineration. In contrast, the polyester-based heat-shrinkable film has a high heat resistant property, easy to be incinerated, and superior in solvent resistance. Therefore, it is widely used as heat-shrinkable labels, and as the distribution amount of PET (polyethylene terephthalate) bottles or the like increases, the usage amount tends to increase more and more.

As described in Patent Literature 1, the conventional heat-shrinkable polyester-based films generally use, for example, amorphous polyester raw material (amorphous raw material). This is because the amorphous molecules are believed to be related to the expression of the shrinkage ratio. For example, it is shown in the Examples in Patent Literature 1 that as the content of the monomers becoming amorphous component increases, the shrinkage ratio tends to increase. The heat-shrinkable polyester-based film using the amorphous raw material, however, has problems that it has a low heat resistant property and a bad irregularity of thickness.

Incidentally, when using the heat-shrinkable film as the label for the bottle, a method is usually used in which the ends of the film are fixed together with a solvent, an adhesive or the like to form a ring-shaped (tube-shaped) label, followed by covering a bottle to shrink. By setting the shrinkage direction to the width direction, the shrinkable label can be continuously manufactured, thus it is effective.

Patent Literature 2 discloses a heat-shrinkable film that heat-shrinks in the transverse (width) direction and hardly heat-shrinks in the longitudinal direction, and a method for producing the same. In Example of Patent Literature 2, polyethylene terephthalate is used as a raw material, and the film that has the desired heat-shrinkage property is manufactured by transverse uniaxial stretching a film that has been wrinkled in the longitudinal direction.

Further, in Patent Literature 3, the applicant of the present invention discloses the heat-shrinkable polyester-based film where, even if a large amount of the monomer components that can become amorphous component is not contained, a sufficient heat-shrinkage property in the main shrinkage direction corresponding to the longitudinal direction (Machine Direction) is exhibited, the heat-shrinkage ratio is low in the width direction (vertical direction) orthogonal to the main shrinkage direction, and the irregularity of thickness in the longitudinal direction is small. In this patent literature, by using the polyester-based unstretched film which contains ethylene terephthalate as a main constitutional component and not less than 0 mol % and not more than 5 mol % of a monomer component capable of serving as an amorphous component relative to the total of a polyester resin component, the heat-shrinkable polyester-based film is obtained by the biaxial stretching method where the transverse stretching is performed after the longitudinal stretching. For example, as the stretching manner A, by using a simultaneous biaxial stretching machine shown in FIG. 1, the stretching (transverse stretching) was performed at a temperature of not less than Tg of the film and not more than (Tg+40° C.) with a ratio of not less than 3.5 times and not more than 6 times in the width direction, and then the stretching (longitudinal stretching) was performed at a temperature of not less than Tg of the film and not more than (Tg+40° C.) with a ratio of not less than 1.5 times and not more than 2.5 times in the longitudinal direction by widening the interval between the clips, and the same time, relaxing the film by narrowing the tenter width by not less than 5% and not more than 30% in the width direction after the transverse stretching.

CITATION LIST

Patent Literature

Patent. Literature 1: JP H08-027260 A
Patent Literature 2: JP 105-169535 A
Patent Literature 3: WO 2015/118968 A1
Non-Patent Literature
Non-Patent Literature 1: T. Kikutani. "Sen'i kouzou no keiseikikou to kouseinou Sen'i no kaihatsu (Formation mechanism of fiber structure and development of high performance fibers)", Sen'i Gakkaishi (Sen'i To Kogyo), Vol. 63, No. 12 (2007)
Non-Patent Literature 2: A. Mahendrasingam et al "Effect of draw ratio and temperature on the strain induced crystallization of poly (ethylene terephthalate) at fast draw rates" Polym. 40 5556 (1999)

SUMMARY OF THE INVENTION

Problems to be Solved by the Invention

As discussed above, Patent Literature 2 discloses the film as the heat-shrinkable film that shrinks significantly in the width direction. In the Examples of Patent Literature 2, however, the heat-shrinkage ratio at 95° C. in the width direction is 12.5% at most, thus it is hard to say that the level of the shrinkage ratio required for the current heat-shrinkable films is satisfied.

In contrast, in the heat-shrinkable polyester-based film disclosed in Patent Literature 3, the main shrinkage direction corresponds to the longitudinal direction. Thus, regarding the film whose width direction is the main shrinkage direction, the film, which has a high heat-shrinkage ratio in the width direction and a small irregularity of thickness, has not been disclosed yet. If the transverse→longitudinal stretching method disclosed in Patent Literature 3 is simply changed to the longitudinal→transverse stretching method, since the non-shrinkage direction (longitudinal direction) cannot be relaxed and the shrinkage ratio in the longitudinal direction becomes high, the desired film cannot be produced. Further, if it is changed to the longitudinal→transverse stretching method, the heat shrinkage stress in the width direction may also increase.

The present invention was made in view of the above circumstances, an object of the present invention is to provide a heat-shrinkable polyester-based film that does not substantially contain amorphous component, where the heat-shrinkage ratio in the width direction is high and the irregularity of thickness is small, and the process for producing the film.

Solution to the Problems

The inventors of the present invention have conducted studies to solve the problems. After that, they found that when stretching the unstretched film obtained by melting and extruding the raw material resin, by employing the transverse stretching method where a preheating is performed at a temperature (T1) of (Tg+40° C.) or higher and (Tg+70° C.) or lower, a transverse stretching of the preheated film is performed at a temperature (T2) of (Tg+5° C.) or higher and (Tg+40° C.) or lower, and a stretching of the transverse stretched film is further performed at a temperature (T3) of (Tg−10° C.) or higher and (Tg+15° C.) or lower (provided, T1>T2>T3), it is possible to control the shrinkage ratio in the longitudinal direction and the width direction and to achieve both high heat-shrinkage ratio and reduction of the irregularity of thickness in the width direction, and completed the present invention.

The constitutions of the present invention are as follows.
1. A heat-shrinkable polyester-based film comprising ethylene terephthalate unit by 90 mol % or more out of whole ester unit 100 mol %, wherein, the heat-shrinkable polyester-based film satisfies the following requirements (1) to (4):
  (1) heat-shrinkage ratio in a width direction measured by shrinking the film for 10 seconds in 90° C. hot water is 50% or more and 75% or less,
  (2) heat-shrinkage ratio in a longitudinal direction measured by shrinking the film for 10 seconds in 90° C. hot water is −6% or more and 14% or less,
  (3) heat-shrinkage ratio in the longitudinal direction measured by shrinking the film for 10 seconds in 70° C. hot water is −6% or more and 6% or less, and
  (4) irregularity of thickness in the width direction is 1% or more and 20% or less. 2. The heat-shrinkable polyester-based film according to the above 1, further satisfying the following requirement (5):
  (5) maximum heat shrinkage stress in the width direction measured by shrinking the film for 30 seconds in 900° C. hot air is 4 MPa or more and 13 MPa or less. 3. The heat-shrinkable polyester-based film according to the above 1 or 2, further satisfying the following requirement (6):
  (6) degree of crystallinity calculated from density is 1% or more and 15% or less.

Advantageous Effects of the Invention

According to the present invention, a heat-shrinkable polyester-based film that does not substantially contain amorphous component, where the heat-shrinkage ratio in the width direction corresponding to the main shrinkage direction is high and the irregularity of thickness is small, can be provided.

DESCRIPTION OF EMBODIMENTS

1. Polyester raw material used for the heat-shrinkable polyester-based film

The polyester raw material used for the heat-shrinkable polyester-based film of the present invention comprises ethylene terephthalate unit by 90 mol % or more out of whole ester unit 100 mol %. The content of ethylene terephthalate is preferably 95 mol % or more, and most preferably 100 mol %. The ethylene terephthalate unit comprises ethylene glycol and terephthalic acid as the main constitutional components. The use of ethylene terephthalate makes it possible that the heat resistant property and the transparency excellent as the heat-shrinkable polyester-based film may be exhibited.

The polyester raw material used for the present invention may comprise amorphous component (amorphous alcohol component and amorphous acid component). The sum of the ratio of the amorphous alcohol component in the whole alcohol component 100 mol % and the ratio of the amorphous acid component in the whole acid component 100 mol %, however, is suppressed to 0 mol % or more and 5 mol % or less. In the present invention, as discussed above, the polyester consisting of the ethylene terephthalate unit is preferable, however, without actively copolymerizing, the unit of including the terephthalic acid and the diethylene glycol may be present in the ethylene terephthalate unit as a by-product. The smaller content of the amorphous component, the better it is, and the most preferable content is 0 mol %.

The monomer for the amorphous acid component (carboxylic acid component) is exemplified by isophthalic acid, 1,4-cyclohexanedicarboxylic acid. 2,6-naphthalenedicarboxylic acid and the like.

Further, the monomer for the amorphous alcohol component (diol component) is exemplified by neopentyl glycol, 1,4-cyclohexanedimethanol, diethylene glycol, 2,2-diethyl-1,3-propanediol, 2-n-butyl-2-ethyl-1,3-propanediol, 2,2-isopropyl-1,3-propanediol, 2.2-di-n-butyl-1,3-propanediol, hexanediol and the like.

For the polyester raw material used for the present invention, as the components other than the ethylene terephthalate and the amorphous component as discussed above, 1,4-butanediol, which corresponds to the diol component other than ethylene glycol, may be used. Since 1,4-butanediol lowers the melting point of the polyester film, it is useful as a low Tg component, however, from the point of the present invention, it is preferable that 1,4-butanediol is not included as much as possible. The content of 1,4-butanediol in the whole alcohol component and the whole acid component is preferably 10 mol % or less, more preferably 5 mol % or less, and the most preferably 0 mol %.

The polyester raw material used for the present invention, as necessary, may contain various kinds of additives. The additives are not particularly limited, and exemplified by the known additives such as a wax, an antioxidant, an antistatic agent, a crystal nucleating agent, a viscosity reducing agent, a heat stabilizer, a coloring pigment, an anti-coloring agent, an ultraviolet absorber and the like.

Further, to improve the operability (slip property) of the film, the polyester raw material may preferably contain fine particles acting as a lubricant. The fine particles may be arbitrarily selected regardless of the kinds of the inorganic fine particles or the organic fine particles. The inorganic fine particles are exemplified by silica, alumina, titanium dioxide, potassium carbonate, kaolin, barium sulfate and the like. The organic fine particles are exemplified by acrylic resin particles, melamine resin particles, silicone resin particles, crosslinked polystyrene particles and the like. The average particle size of the fine particles is preferably within the range of about 0.05 to 3.0 μm as measured by a Coulter counter.

The method for adding the fine particles to the polyester raw material is not particularly limited, and, for example, the fine particles may be added at any stage in production of the polyester-based resin. However, it is preferable that the fine particles are added in the form of a slurry with the fine particles dispersed in the ethylene glycol or the like at a stage of the esterification or at a stage after the completion of the ester exchange reaction and before the start of the polycondensation reaction, thereafter the polycondensation reaction is carried out. Further, it may be performed by a method in which a slurry of the fine particles dispersed in the ethylene glycol, water or the like and the polyester-based resin raw material are blended using a kneading extruder with a vent; or a method in which the dried fine particles and the polyester-based resin raw material are blended using a kneading extruder: or the like.

The intrinsic viscosity of the polyester raw material is preferably within the range of 0.50 to 0.75 d/g. If the intrinsic viscosity is less than 0.50 dl/g, the effect of improving a tear resistance may deteriorate. In contrast, if it is more than 0.75 d/g, a filtration pressure may increase to make it difficult to perform a filtration with a high precision. The intrinsic viscosity is more preferably 0.52 dl/g or more and 0.73 dl/g or less.

For improving the printability and the adhesiveness of the surface of the film, it is also possible to subject the heat-shrinkable polyester-based film of the present invention to corona treatment, coating treatment, flame treatment or the like.

2. Property of the Heat-Shrinkable Polyester-Based Film of the Present Invention The film of the present invention satisfies the above requirements (1) to (4). When the heat-shrinkable film is used for the bottle label application, the factors of most contributing to the shrinkage finish property of the label are as follows; 90° C. stipulated in (1) for the width direction, and 70° C. or 90° C. stipulated in (2) or (3) for the longitudinal direction. It is technically difficult to control the shrinkage ratio in that temperature zone compared to the other temperature zones. The present invention is very useful because of providing the heat-shrinkable polyester-based film with a very high heat-shrinkage ratio in the width direction corresponding to the main shrinkage direction stipulated in (1), a low heat-shrinkage ratio in the longitudinal direction stipulated in (2) or (3), and a small irregularity of thickness.

2.1. Heat-Shrinkage Ratio in the Width Direction

As stipulated in the above (1), the heat-shrinkable polyester-based film of the present invention satisfies that the heat-shrinkage ratio in the width direction (main shrinkage direction), which is measured by dipping the film for 10 seconds in 90° C. hot water, is 50% or more and 75% or less. For reference, the "width direction" means a direction that is orthogonal to the longitudinal direction (Machine Direction: MD), and it is also referred to as the Transverse Direction (TD). If the heat-shrinkage ratio in the width direction at 900° C. is less than 50%, when shrinking to cover a container or the like, the shrinkage of the film is insufficient and the film does not adhere to the container neatly, resulting in poor appearance, thus it is not preferable. In contrast, if the heat-shrinkage ratio in the width direction at 90° C. is more than 75%, when shrinking to cover a container or the like, the shrinkage rate becomes extremely high, resulting in causing the distortion of the film or the like, thus it is not preferable. The heat-shrinkage ratio in the width direction at 90° C. is preferably 55% or more and 70% or less, and more preferably 60% or more and 65% or less.

2.2. Heat-Shrinkage Ratio in the Longitudinal Direction

As stipulated in the above (2), the heat-shrinkable polyester-based film of the present invention satisfies that the heat-shrinkage ratio in the longitudinal direction (Machine Direction, MD), which is measured by dipping the film for 10 seconds in 90° C. hot water, is −6% or more and 14% or less. If the heat-shrinkage ratio in the longitudinal direction at 90° C. is less than −6%, when shrinking to cover a container or the like, the elongation will occur to cause wrinkles easily, resulting in poor shrinkage appearance, thus it is not preferable. In contrast, if the heat-shrinkage ratio in the longitudinal direction at 90° C. is more than 14%, it is not preferable since it is likely to cause a distortion or a sink after shrinkage. The heat-shrinkage ratio in the longitudinal direction at 90° C. is preferably −4% or more and 12% or less, and more preferably −2% or more and 10% or less.

Further, as stipulated in the above (3), the heat-shrinkable polyester-based film of the present invention satisfies that the heat-shrinkage ratio in the longitudinal direction (Machine Direction, MD), which is measured by dipping the film for 10 seconds in 70° C. hot water, is −6% or more and 6% or less. If the heat-shrinkage ratio in the longitudinal direction at 70° C. is less than −6%, when shrinking to cover a container or the like, the elongation will occur to cause wrinkles easily, resulting in poor shrinkage appearance, thus it is not preferable. In contrast, if the heat-shrinkage ratio in the longitudinal direction at 70° C. is more than 6%, it is not preferable since it is likely to cause a distortion or a sink after shrinkage. The heat-shrinkage ratio in the longitudinal direction at 70° C. is preferably −4% or more and 4% or less, and more preferably −2% or more and 2% or less.

2.3. Irregularity of Thickness in the Width Direction

As stipulated in the above (4), the heat-shrinkable polyester-based film of the present invention satisfies that the irregularity of thickness, when the measurement length in the width direction is determined to be 1 m, is 1% or more and 20% or less. If the irregularity of thickness in the width direction is more than 20%, it is not preferable since, when the film is wound up as a roll, not only the appearance defects such as edge slippage and wrinkle but also printing defects are likely to occur when printing the film, thus it is not preferable. The irregularity of thickness in the longitudinal direction is preferably 19% or less, and more preferably 18% or less. The smaller the irregularity of thickness in the width direction is, the more preferable it is, however, considering the performance of the film forming devices, the limit is considered to be about 1%.

2.4. Maximum Heat Shrinkage Stress in the Width Direction

As stipulated in the above (5), the heat-shrinkable polyester-based film of the present invention preferably satisfies that the maximum heat shrinkage stress in the width direction measured by shrinking the film for 30 seconds in 90° C. hot air is 4 MPa or more and 13 MPa or less. When heat shrinking, if the maximum heat shrinkage stress in the width direction at 90° C. is more than 13 MPa, it is not preferable since the object to be packaged, such as a container or the like, is easy to be deformed. In contrast, the lower maximum heat shrinkage stress in the width direction is, the more preferable it is, since the object to be packaged is less deformed. However, considering the current technical level, the lower limit is 4 MPa.

2.5. Degree of Crystallinity Calculated from Density

As stipulated in the above (6), the heat-shrinkable polyester-based film of the present invention preferably satisfies that the degree of crystallinity calculated from density is 1% or more and 15% or less. If the degree of crystallinity is more than 15%, the heat-shrinkage ratio in the width direction will increase. The relations between the heat-shrinkage ratio in the width direction and degree of crystallinity will be discussed later. The lower the degree of crystallinity is, the more preferable it is, since the heat-shrinkage ratio in the width direction increases. The degree of crystallinity is more preferably 13% or less, and further preferably 11% or less. For reference, considering the current technical level, the lower limit of the degree of crystallinity is about 1%. The method of measuring the degree of crystallinity will be described in EXAMPLES.

2.6. Other Properties

Considering that the film is used for the label for the bottle or the banding film used for banding lunch boxes or the like, the thickness of the heat-shrinkable polyester-based film of the present invention is preferably 5 μm or more and 200 μm or less, and more preferable 20 μm or more and 100 μm or less. If the thickness is more than 200 μm, it is not economical since the weight per area of the film simply increases. In contrast, if the thickness is less than 5 μm, since the film becomes extremely thin, handling during the process such as for making a tube label is difficult (poor handling).

Further, the haze value is preferably 2% or more and 13% or less. If the haze value is more than 13%, it is not preferable since the transparency will be poor and the appearance may be poor when making labels. The haze value is more preferably 11% or less, and further preferably 9% or less. The smaller the haze value is, the more preferable it is. However, considering that it is necessary to add a predetermined amount of the lubricant to the film for the purpose of giving practically necessary slip property, the lower limit is about 2%.

3. Process for Producing the Heat-Shrinkable Polyester-Based Film of the Present Invention The heat-shrinkable polyester-based film of the present invention may be produced by forming an unstretched film by melting and extruding the polyester raw material with an extruder, and followed by transverse stretching the unstretched film under the following conditions. Specifically, a preheating is performed at a temperature (T1) of (Tg+40° C.) or higher and (Tg+70° C.) or lower, a transverse stretching of the preheated film is performed at a temperature (T2) of (Tg+5° C.) or higher and (Tg+40° C.) or lower, and a stretching of the transverse stretched film is further performed at a temperature (T3) of (Tg−10° C.) or higher and (Tg+15° C.) or lower. For reference, T1, T2, and T3 satisfies the relation of T1>T2>T3. As necessary, after the second transverse stretching at T3, a heat treatment may be performed at a temperature of (Tg−30° C.) or higher and Tg or lower. The polyester may be obtained by polycondensing the above-mentioned preferred dicarboxylic acid component and diol component by a known method. Further, two or more chip-shaped polyesters may be mixed and used as the raw material of the film.

Hereinafter, each step will be discussed in detail.

3.1. Melt-Extrusion

When melting and extruding the raw material resin, it is preferable to dry the polyester raw material with a dryer such as a hopper dryer or a paddle dryer, or a vacuum dryer. After drying the polyester raw material in this manner, it is melted at a temperature of 200 to 300° C., and extruded into a film shape with the extruder. In extrusion, any existing method such as a T-die method or a tubular method may be employed.

Thereafter, the unstretched film may be obtained by rapidly cooling the extruded sheet-shaped molten resin. As a method for rapidly cooling the molten resin, a method may be suitably employed in which the molten resin is cast onto a rotating drum from a mouthpiece, and rapidly cooled and solidified to obtain a substantially unoriented resin sheet.

By stretching the obtained unstretched film in the width (transverse) direction in the method discussed below, the heat-shrinkable polyester-based film of the present invention may be produced.

3.2. Transverse Stretching

Hereinafter, the stretching method to produce heat-shrinkable polyester-based film of the present invention will be discussed in detail, considering the conventional film forming method for the heat-shrinkable polyester-based film and the difference of the molecular structure by citing Non-Patent Literature 1 and 2.

The details of the molecular structure that controls the shrinkage behavior of the film are still largely unknown. Roughly, the oriented amorphous molecules are believed to be related to the shrinkage properties. Therefore, the heat-shrinkable polyester-based film is usually produced by using the amorphous raw material and stretching in the desired shrinkage direction (main shrinkage direction, usually the width direction). The conventional heat-shrinkable polyester-based film using the amorphous raw material is generally produced by stretching at a temperature of the glass transition temperature (Tg) to Tg+30° C. with a stretch ratio (total stretch ratio) of about 3.5 times to 5.5 times. It is considered that this stretching condition makes the amorphous molecules oriented and provides the film with the shrinkage ratio. The lower the stretching temperature is, or the higher the stretch ratio is, the higher the shrinkage ratio is (i.e., the amorphous molecules are easy to be oriented).

In contrast, in the case where the monomer component (amorphous raw material) that can be the amorphous component is 0 mol % or more and 5 mol % or less, which does not substantially contain the amorphous raw material as the present invention, when the stretching is performed at the same temperature as above, i.e., at a temperature of Tg to Tg+30° C., the film shrinks if it is stretched with a ratio of 2 times to 2.5 times. However, when the stretching is performed with the same ratio as above, i.e., about 3.5 times to 5.5 times, the shrinkage ratio of the film decreases on the contrary. For example, both Comparative Example 1 and 3 in Table 2 below are the examples of producing the film using the polyester raw material of Tg=75° C. by transverse stretching at a temperature of 85 to 90° C. (Comparative Example 1) or 80° C. (Comparative Example 3) with a stretch ratio of 3.6 times (Comparative Example 1) or 2.4 times (Comparative Example 3). In Comparative Example 3 where the stretch ratio is low at 2.4 times, the shrinkage ratio in the width direction is high at 55.3%. In contrast, in Comparative Example 1 where the stretch ratio is high at 3.6 times, the shrinkage ratio in the width direction dropped significantly to 26.8%.

The reason for that is believed to be that the oriented molecules crystallize by stretching (oriented-crystallization) to hinder the shrinkage of the film (in other words, the shrinkage of the amorphous molecules). For example, in FIG. 4 in Non-Patent Literature 1, the relationship between the stress (horizontal axis) and the birefringence (vertical axis) in uniaxial stretching of the polyethylene terephthalate fiber is shown. From this figure, we can read how the molecular orientation changed. Therefore, in the area where the stretch ratio DR is up to about 2 times, there is a linear relationship between the stress and the birefringence. When the stretching stopped, the stress was relaxed, and the birefringence reduced. The reduction of the birefringence shows the relaxation of the molecular chain, when replaced with the film, it is believed to show the shrinkage of the film (the expression of the shrinkage ratio). In contrast, when the stretch ratio DR is more than 2 times, the linear relationship between the stress and the birefringence is difficult to be kept. When the stretching stopped, it is hard to see the reduction of birefringence. This phenomenon is considered to show a reduction of the shrinkage ratio by the oriented-crystallization. From that, in the case where the amorphous raw material is not substantially contained as the present invention, under the condition that the oriented-crystallization does not occur by stretching, the shrinkage ratio is considered to express in the film.

The stretching condition that the oriented-crystallization does not occur by stretching, for example, is shown in the picture of FIG. 2 in Non-Patent Literature 2. This figure indicates that the crystal peak was observed in stretching at a low temperature of 85° C. (=Tg+100° C.), whereas the crystal peak was not observed in stretching at a high temperature of about 130° C. (=Tg+55° C.) and the molecules were not oriented-crystallized at all. This is thought that the relaxation of the molecules, which occurs during stretching, is faster than the speed of the orientation in case of stretching at a high temperature. As a matter of fact, the inventors of the present invention performed a stretching at a high temperature using a film manufacturing line at a constant temperature of 130° C., and they found that, as shown in the above mechanism, the shrinkage ratio did not express since the molecules were not oriented. Further, not only the shrinkage ratio did not express, but also they found that the irregularity of thickness was deteriorated (large) since the stress did not increase during stretching.

Therefore, the inventors of the present invention found that, instead of making the entire stretching process being a stretching at a high temperature (constant) as discussed above, by separately performing the process of hardly orienting the molecules by stretching at a high temperature and the process of positively orienting the molecules by stretching at a low temperature, while suppressing the reduction of the shrinkage ratio by the oriented-crystallization, the shrinkage ratio can be expressed by orienting only amorphous molecules and the irregularity of thickness can be suppressed at a low level, and completed the present invention. Specifically, as discussed in detail below, we found that by the method where the preheating is performed at a temperature T1, the transverse stretching is performed at a temperature T2, and the transverse stretching is performed at a temperature T3 (T1>T2>T3), since only the amorphous molecules are present in the film, it is possible to control the heat-shrinkage ratio in the longitudinal direction and the width direction, and further the reduction of the irregularity of thickness in the width direction will be achieved.

Hereinafter, each step will be discussed in order.

First of all, the preheating zone is preheated at a temperature T1 of (Tg+40° C.) or higher and (Tg+70° C.) or lower. If the preheating temperature T1, is lower than (Tg+400° C.), the molecules tend to be oriented-crystallized at the time of transverse stretching at T2 in the next step, the heat-shrinkage ratio in the width direction of the film is easy to fall below the lower limit of 50% (see Comparative Example 1 in Table 2 below). Further, if the preheating temperature T1 is lower than (Tg+40° C.), the neck—in generated by transverse stretching increases the stress applied to the longitudinal direction, it is not preferable since the heat-shrinkage ratio in the longitudinal direction is easy to exceed the upper limit of 6%. In contrast, if the preheating temperature T1 is higher than (Tg+70° C.), it is not preferable since the irregularity of thickness in the width direction deteriorates and it is easy to exceed the upper limit of 20%. The preheating temperature T1 is more preferably (Tg+45° C.) or higher and (Tg+65° C.) or lower, and further preferably (Tg+50° C.) or higher and (Tg+60° C.) or lower.

Specifically, it is preferable to control the passing time through the preheating zone within the range of 2 seconds or more and 10 seconds or less so that the preheating temperature T1 is reached. If the passing time through the preheating zone is less than 2 seconds, before the film reaches the preheating temperature T1, the transverse stretching at T2, which is a next step, will start. Thus, the similar problem to the case where the preheating temperature T1 is lower than (Tg+40° C.) will occur. The longer the passing time through the preheating zone is, the more preferable it is, since the temperature of the film is easy to reach the preheating temperature T1. However, if the passing time is too long, the temperature at the preheating zone would be set to be above the cold crystallizing temperature. Thereby, the crystallization of the unstretched film would be excessively promoted, thus it is not preferable. Furthermore, the longer the passing time through the preheating zone is, the more the production equipment is required, thus it is not preferable. The passing time through the preheating zone of 10 seconds is sufficient.

Secondly, the film preheated at a temperature T1 is subjected to a transverse stretching at a temperature T2 of (Tg+5° C.) or higher and (Tg+40° C.) or lower (sometimes, referred to as first transverse stretching). In the first transverse stretching, as mentioned above, it is necessary to suppress the molecular orientation by stretching, the temperature T2 in the first transverse stretching is made lower than the preheating temperature T1 and is controlled within the range of (Tg+5° C.) or higher and (Tg+40° C.) or lower. If the temperature T2 in the first transverse stretching is lower than (Tg+5° C.), the similar problem to the case of preheating will occur. Further, not only the heat-shrinkage ratio in the width direction of the film is easy to fall below the lower limit of 50%, but also the heat-shrinkage ratio in the longitudinal direction is easy to exceed the upper limit of 6%, thus it is not preferable. In contrast, if the temperature T2 in the first transverse stretching is higher than (Tg+400° C.), it is not preferable since the irregularity of thickness in the width direction is easy to exceed the upper limit of 20%. The temperature T2 in the first transverse stretching is more preferably (Tg+10° C.) or higher and (Tg+35° C.) or lower, and further preferably (Tg+15° C.) or higher and (Tg+30° C.) or lower.

Furthermore, the stretch ratio in the first transverse stretching is preferably 1.5 times or more and 2.5 times or less. If the stretch ratio in the first transverse stretching is less than 1.5 times, the effect of suppressing the oriented-crystallization is reduced, the shrinkage ratio in the width direction of the film is easy to fall below 50%, and the shrinkage ratio in the longitudinal direction is easy to exceed 6%, thus it is not preferable. In contrast, if the stretch ratio in the first transverse stretching is more than 5 times, it is not preferable since the irregularity of thickness in the width direction is easy to exceed 20%. The stretch ratio in the first transverse stretching is more preferably 1.6 times or more and 2.4 times or less, and further preferably 1.7 times or more and 2.3 times or less.

The transverse stretched film is subjected to a further stretching at a temperature T3 of (Tg−100° C.) or higher and (Tg+150° C.) or lower (sometimes, referred to as second transverse stretching). As discussed above, in first transverse stretching, the stretching is performed at a high temperature so as to suppress the molecular orientation. On the contrary, in the second transverse stretching thereafter, it is necessary to positively induce the molecular orientation by stretching. For that reason, in the present invention, stretching is performed at low temperature so that the temperature satisfies T2>T3, specifically, the temperature T3 in the second transverse stretching is (Tg−10° C.), or higher and (Tg+15° C.) or lower. If the temperature T3 in the second transverse stretching is lower than (Tg−10° C.), neck—in generated by transverse stretching increases the stress applied to the longitudinal direction, it is not preferable since the heat-shrinkage ratio in the longitudinal direction is easy to exceed the upper limit of 6%. In contrast, if the temperature T3 in the second transverse stretching higher than (Tg+15° C.), the molecular orientation is small, the heat-shrinkage ratio in the width direction is easy to fall below the lower limit of 50% (see Comparative Example 5 in Table 2 below). The temperature T3 in the second transverse stretching is more preferably (Tg−7° C.) or higher and (Tg+12° C.) or lower, and further preferably (Tg−40° C.) or higher and (Tg+9° C.) or lower.

Furthermore, the stretch ratio in the second transverse stretching is preferably 1.5 times or more and 2.5 times or less. If the stretch ratio in the second transverse stretching is less than 1.5 times, the irregularity of thickness in the width direction deteriorates. In contrast, the stretch ratio in the second transverse stretching is more than 2.5 times, not only the shrinkage ratio in the width direction is likely to decrease, but also the shrinkage stress in the width direction increases. The stretch ratio in the second transverse stretching is more preferably 1.6 times or more and 2.4 times or less, and further preferably 1.7 times or more and 2.3 times or less.

Additionally, the total stretch ratio (calculated by multiplying the stretch ratio in the first transverse stretching by the stretch ratio in the second transverse stretching) is preferably 3 times or more and 5.5 times or less. If the total stretch ratio is less than 3 times, not only the shrinkage ratio in the width direction is likely to decrease, but also the irregularity of thickness in the width direction deteriorates. In contrast, if the total stretch ratio is more than 5.5 times, when stretching in the width direction, breakage is likely to occur. The total stretch ratio is more preferably 3.1 times or more and 5.4 times or less, and further preferably 3.2 times or more and 5.3 times or less.

In the present invention, the preheating temperature T1, the temperature T2 in the first transverse stretching, and the temperature T3 in the second transverse stretching satisfies the relation of T1>T2>T3. The desired film may be obtained by performing transverse stretching so that each T1, T2, and T3 satisfies the above-described range while satisfying this relation.

3.3. Heat Treatment The film that was subjected to the transverse stretching as mentioned-above, as necessary, may be subjected to a heat treatment in a tenter while gripping the both edges in the width direction with clips. For reference, the heat treatment means the heat treatment at a temperature of (Tg−20° C.) or higher and Tg or lower for 1 second or longer and 9 seconds or shorter. Such a heat treatment will suppress the deterioration of the heat-shrinkage ratio, and further, since the dimensional stability after storage over time is improved, it is preferably employed. If the heat treatment temperature is lower than (Tg−20° C.), the above effects by the heat treatment may not be effectively exhibited. In contrast, if the heat treatment temperature is higher than Tg, heat-shrinkage ratio in the width direction is easy to fall below the lower limit of 50%.

The temperature at the time of the heat treatment is preferably lower than or equal to a temperature T3 in the second transverse stretching.

Based on the stipulates regarding the heat treatment, in all examples of Examples 1 to 6 and Comparative Examples 1 to 3, 5 described later (in these examples, Tg=75° C.) except for Example 3, the heating temperature after the transverse stretching is set to be 5° C., which is not satisfied with the above range of temperature. Thus, these are not considered as the examples where the heat treatment is performed in the present invention. On the contrary, in Example 3, the heating temperature after the transverse stretching is set to be 75° C., it is considered as the example where the heat treatment is performed in the present invention.

The longer the heat treatment time is, the easier the effect will be exhibited. However, if it is too long, the huge equipment will be required. Thus, it is preferably controlled within 1 second or longer and 9 seconds or shorter, and more preferably within 5 seconds or longer and 8 seconds or shorter.

Further, in the heat treatment step, by reducing the distance between the gripping clips in a tenter, it, is also possible that the width direction is relaxed. Thereby, it is possible to suppress the dimensional change after storage over time and the deterioration of the heat-shrinkage property.

The present application claims for benefit of priority based on JP Patent Application No. 2018-066740 filed on Mar. 30, 2018. The entirety of the specification of JP Patent Application No. 2018-066740 filed on Mar. 30, 2018 is incorporated herein for reference.

EXAMPLES

Next, the present invention will be specifically described with reference to Examples and Comparative examples, but the present invention is not limited to the aspects of the Examples at all, and can be appropriately modified within the scope not departing from the gist of the present invention.

The following properties were evaluated for each polyester film described in Table 2 below.
[Heat-Shrinkage Ratio (Heat-Shrinkage Ratio in Hot Water)]

A polyester-based film was cut out into a square of 10 cm×10 cm, and dipped in hot water with a predetermined temperature of [(90° C. or 70° C.)±0.5° C.] in a no-load state for 10 seconds to be heat-shrunk, followed by being dipped in water with a temperature of 25° C.±0.5° C. for 10 seconds, and then pulled out from the water. A dimension in the longitudinal direction and a dimension in the width direction of the film was measured, and a heat-shrinkage ratio was calculated according to the following Equation 1, respectively. The direction having a larger heat-shrinkage ratio was determined as the main shrinkage direction (width direction).

Heat-shrinkage ratio (%)={(length before shrinkage−length after shrinkage)/length before shrinkage}×100     Equation 1

[Irregularity of Thickness in the Width Direction]

From the roll of the film, a wide belt-shaped film sample having a size in the longitudinal direction of the film of 40 mm×and a size in the width direction of the film of 1.2 m was sampled. Using a continuous contact type thickness gauge manufactured by Mikuron Measuring Instrument Co., Ltd, the thickness was continuously measured at a measuring speed of 5 m/min along the width direction of the film sample (measuring length was 1 m). The maximum thickness at a time of measuring was determined as Tmax., the minimum thickness was determined as Tmin. and the average thickness was determined as Tave.. According to the following Equation 2, the irregularity of thickness in the width direction of the film was calculated.

$$\text{Irregularity of thickness (\%)}=R(T\text{max.}-T\text{min.})/T\text{ave.}\times 100 \qquad \text{Equation 2}$$

[Maximum Heat Shrinkage Stress]

A sample having a length of 200 mm in a main shrinkage direction (width direction) and a width of 20 mm (longitudinal direction) was cut out from a polyester-based film, and measured using a strength and elongation measuring machine with a heating furnace (TENSILON, registered trademark of ORIENTEC Co., LTD.). The heating furnace was previously heated to 90° C., and the distance between chucks was set to of 100 mm. The ventilation to the heating furnace was temporarily stopped, and the door of the heating furnace was opened. Thereafter, the sample was attached to chucks, and the doors of the heating furnace was quickly closed, followed by resuming the ventilation. The heat shrinkage stress in the width direction was measured by shrinking the film for 30 seconds in 90° C. hot air, and the maximum value thereof was determined as a maximum heat shrinkage stress (MPa).

[Haze]

According to JIS K 7136, measurement was performed using a haze meter "500A" (manufactured by Nippon Denshoku Industries Co., Ltd.). The measurement was performed twice, and the average value was calculated.

[Degree of Crystallinity]

According to Density gradient tube method in JIS K 7112, using an aqueous solution of calcium nitrate, the density d of the sample of about 3 mm square was measured, and the degree of crystallinity was calculated according to the following Equation 3.

$$\text{Degree of crystallinity (\%)}=\{dc\times(d-da)/(d\times(dc-da))\}/100 \qquad \text{Equation 3}$$

dc: 1.455 g/cm² (the density of the perfect crystal of polyethylene terephthalate)

da: 1.335 g/cm³ (the density of the perfect amorphous of polyethylene terephthalate)

d: the density of the sample (g/cm³)

[Tg (Glass Transition Temperature)]

Using a differential scanning calorimeter manufactured by Seiko Instruments & Electronics Ltd. (Model: DSC220), according to JIS-K71.21-1987, Tg was measured. Specifically, the unstretched film (10 mg) was heated from −40° C. to 120° C. at a heating speed of 10° C./min, and endothermic curve was measured. Tangent lines were drawn before and after the inflection point on the measured endothermic curve, and intersection was regarded as a glass transition temperature (Tg; ° C.).

[Evaluations of the Shrinkage Finish Property]

One end of the polyester-based film was attached to the other end, and welded by an impulse sealer (manufactured by Fujiimpulse Co., Ltd.) to obtain a cylindrical label with the width direction being in the circumferential direction. This label was put on a commercially available PET bottle (content is present; "Oi, Ocha" manufactured by Ito en, Ltd), and was heat-shrinked through a steam adjusted at 85° C. (tunnel passing time: 30 seconds). The shrinkage finish property of the label was evaluated by visual observation on five ranks according to the following criteria. The defects described below mean a jumping, a wrinkle, an insufficient shrinkage, a label edge fold, a shrinkage whitening and the like.

5: Finish property was best (no defects were observed)
4: Finish property was good (0 defect was observed)
3: 2 defects were observed
2: 3 to 5 defects were observed
1: Many defects (6 defects or more) were observed <Preparation of Polyester Raw Material>

Preparation of Polyester Raw Material A

To a stainless steel autoclave equipped with a stirrer, a thermometer and a partially circulating cooler, dimethyl terephthalate (DMT) 100 mol % as a dicarboxylic acid component, and ethylene glycol (EG) 100 mol % as a polyol component were added in such a manner that the amount of ethylene glycol was 2.2 times the amount of dimethyl terephthalate in terms of a molar ratio. An ester exchange reaction was carried out using zinc acetate 0.05 mol % (based on the acid component) as an ester exchange catalyst and antimony trioxide 0.225 mol % (based on the acid component) as polycondensation catalyst while generated methanol was distilled away to outside of the system. Thereafter, a polycondensation reaction was carried out at 280° C. under a reduced pressure of 26.7 Pa to obtain a polyester (A) having an intrinsic viscosity of 0.58 dl/g. This polyester is polyethylene terephthalate. The intrinsic viscosity (dl/g) was measured using Ostwald viscometer at 30° C. by dissolving polyester (0.2 g) in the mixed solvents of phenoL/1,1,2,2-tetrachloroethane (60/40, weight ratio; 50 mL). This polyester raw material A is corresponding to polyethylene terephthalate. The composition of the monomer component for polyester raw material A is shown in Table 1. In Table 1, in the "acid component" column, the content of each monomer component in 100 mol % of whole acid component is shown, and in the "polyol component" column, the content of each monomer component in 100 mol % of whole polyol component is shown.

Preparation of Polyester Raw Materials B to D

By the same method as the polyester raw material A, as shown in Table 1, polyester raw materials B to D with different monomer components were obtained. The polyester raw material B was produced by adding $SiO_2$ (Sylysia 266 manufactured by Fuji Silysia Chemical Ltd.; average particle diameter 1.5 μm) as a lubricant with a ratio of 7,000 ppm to polyester. Each polyester raw material was chipped appropriately. In Table 1, TPA means terephthalic acid, BD means 1,4-butanediol. CHDM means 1.4-cyclohexanedimethanol, and DEG means diethylene glycol which is a by-product. The intrinsic viscosity of each polyester raw material was B: 0.58 dl/g, C: 0.80 dl/g, and D: 1.20 dl/g, respectively.

TABLE 1

| Polyester raw material | Composition of polyester raw material (mol %) | | | | | Added amount of lubricant (ppm) |
|---|---|---|---|---|---|---|
| | Acid component | Polyol component | | | | |
| | TPA | EG | BD | CHDM | DEG | |
| A | 100 | 99 | — | — | 1 | — |
| B | 100 | 99 | — | — | 1 | 7000 |
| C | 100 | 68 | — | 30 | 2 | — |
| D | 100 | — | 100 | — | — | — |

Using the above polyester raw materials A to D, various polyester-based films described in Table 2 were obtained.

Example 11

Polyester A and Polyester B were mixed in a mass ratio of 95:5, and introduced into an extruder. This mixed resin was melted at 280° C., extruded from T-die, and wound around a rotating metallic roll cooled to a surface temperature of 30° C., so that the mixed resin was rapidly cooled, thereby obtaining an about 150 μm-thick unstretched film. Tg of the unstretched film was 75-C.

The obtained unstretched film was guided to a transverse stretching machine (tenter), and preheated at 1400° C. for 5 seconds. The film after preheating was continuously introduced into the first half zone of the transverse stretching, and the film was stretched in the transverse direction by 2.1 times at 105° C. Thereafter, in the second half zone of the transverse stretching, the film was stretched in the transverse stretching direction by 1.8 times at 82° C. The total transverse stretch ratio was 3.8 times. Finally, the heat treatment was performed in the heat treatment zone at 50° C. for 3 seconds, thereafter cooled, and both edges were cut and removed, followed by being wound up into a roll with a width of 500 mm. Thereby, a transverse stretched film with a thickness of 40 μm was continuously manufactured over a predetermined length, and the film of Example 1 was obtained.

[Examples 2 to 6, Comparative Examples 1 to 3 and 5]

In the same manner as Example 1 except that the condition of transverse stretching in Example 1 was changed as shown in Table 2, the films of Examples 2 to 6, Comparative Examples 1 to 3 and 5 were produced.

Comparative Example 41

Polyester raw material A, Polyester raw material B, Polyester raw material C, and Polyester raw material D were mixed in a mass ratio of 18:5:67:10, and introduced to the extruder. This mixed resin was melted at 28° C., extruded from T-die, and wound around a rotating metallic roll cooled to a surface temperature of 30° C., thereby obtaining an about 150 μm-thick unstretched film. Tg of the unstretched film was 68° C.

Then, in the same manner as Example 1 except that the condition of transverse stretching in Example] was changed as shown in Table 2, the film of Comparative Example 4 was produced.

The characteristics of each film produced in those ways were evaluated by the above methods. These results are also shown in Table 2.

TABLE 2A

| | | | Example 1 | Example 2 | Example 3 | Example 4 | Example 5 | Example 6 |
|---|---|---|---|---|---|---|---|---|
| Composition of raw material for film (mass %) | Polyester.A | | 95 | 95 | 95 | 95 | 95 | 95 |
| | Polyester B | | 5 | 5 | 5 | 5 | 5 | 5 |
| | Poivester C | | 0 | 0 | 0 | 0 | 0 | 0 |
| | Polyester D | | 0 | 0 | 0 | 0 | 0 | 0 |
| Amount of ethylene glycol monomer (mol %) | | | 99 | 99 | 99 | 99 | 99 | 99 |
| Amount of terephthalic acid monomer (mol %) | | | 100 | 100 | 100 | 100 | 100 | 100 |
| Ratio of amorphous component (mol %) | | | 1 | 1 | 1 | 1 | 1 | 1 |
| Glass transition temperature Tg (° C.) | | | 75 | 75 | 75 | 75 | 75 | 75 |
| Transverse stretching | Preheating zone | Temperature T1 (° C.) | 140 | 130 | 130 | 130 | 130 | 130 |
| | First stretching | Temperature T2 (° C.) | 105 | 110 | 90 | 100 | 100 | 90 |
| | | Ratio | 2.1 | 2.2 | 2.1 | 2.0 | 2.2 | 1.9 |
| | Second stretching | Temperature T3 (° C.) | 82 | 82 | 82 | 81 | 70 | 82 |
| | | Ratio | 1.8 | 1.9 | 1.9 | 2.0 | 2.1 | 1.9 |
| | Total stretch ratio (First stretching * Second stretching) | | 3.8 | 4.2 | 4.0 | 4.0 | 4.6 | 3.6 |
| | Heat treatment | Temperature | 50 | 50 | 75 | 50 | 50 | 50 |
| Thickness (μm) | | | 40 | 40 | 40 | 40 | 40 | 40 |
| Heat-shrinkage ratio in 70° C. hot water (%) | Longitudinal direction | | -4.3 | -2.0 | 5.1 | 2.4 | 2.8 | 5.4 |
| | Width direction | | 24.0 | 34.0 | 15.0 | 27.0 | 44.1 | 18.9 |
| Heat-shrinkage ratio in 90° C. hot water (%) | Longitudinal direction | | -4.1 | -2.0 | 7.0 | -0.3 | -1.8 | 3.6 |
| | Width direction | | 63.4 | 64.0 | 51.0 | 67.2 | 72.1 | 60.9 |
| Irregularity of thickness in the width direction (%) | Width direction | | 17.3 | 18.9 | 17.9 | 19.1 | 15.9 | 11.0 |
| Maximum heat shrinkage stress in 90° C. hot air (MPa) | Width direction | | 4.5 | 6.4 | 7.8 | 9.3 | 11.6 | 8.4 |
| Haze (%) | | | 4.8 | 4.5 | 4.6 | 5.3 | 5.8 | 4.5 |
| Densty (g/cm$^3$) | | | 1.3413 | 1.3428 | 1.3484 | 1.3491 | 1.3441 | 1.3427 |
| Degree of crystalinty (%) | | | 5.7 | 7.0 | 12.0 | 12.7 | 8.2 | 7.0 |
| Evaluation result of shrinkage finish property | | | 5 | 5 | 4 | 5 | 5 | 4 |

TABLE 2B

|  |  |  | Comparative Example 1 | Comparative Example 2 | Comparative Example 3 | Comparative Example 4 | Comparative Example 5 |
|---|---|---|---|---|---|---|---|
| Composition | Polyester A |  | 95 | 95 | 95 | 18 | 95 |
| of raw | Polyester B |  | 5 | 5 | 5 | 5 | 5 |
| material for | Polyester C |  | 0 | 0 | 0 | 67 | 0 |
| film (mass %) | Polyester D |  | 0 | 0 | 0 | 10 | 0 |
| Amount of ethylene glycol monomer (mol %) |  |  | 99 | 99 | 99 | 68.7 | 99 |
| Amount of terephthalic acid monomer (mol %) |  |  | 100 | 100 | 100 | 100 | 100 |
| Ratio of amorphous component (mol %) |  |  | 1 | 1 | 1 | 21 | 1 |
| Glass transition temperature Tg (° C.) |  |  | 75 | 75 | 75 | 68 | 75 |
| Transverse | Preheating zone | Temperature T1 (° C.) | 90 | 130 | 80 | 80 | 130 |
| stretching | First stretching | Temperature T2 (° C.) | 85 | 70 | 80 | 80 | 95 |
|  |  | Ratio | 1.9 | 2.0 | 1.6 | 2.1 | 2.1 |
|  | Second stretching | Temperature T3 (° C.) | 85 | 70 | 80 | 80 | 95 |
|  |  | Ratio | 1.9 | 1.8 | 1.5 | 2.1 | 1.8 |
|  | Total stretch ratio (First stretching * Second stretching) |  | 3.6 | 3.6 | 2.4 | 4.4 | 3.8 |
|  | Heat treatment | Temperature | 50 | 50 | 50 | 81 | 50 |
| Thickness (μm) |  |  | 40 | 40 | 40 | 40 | 40 |
| Heat-shrinkage ratio in 70° C. hot water (%) | Longitudinal direction |  | 5.9 | 16.0 | 2.4 | −0.3 | 1.2 |
|  | Width direction |  | 4.9 | 20.0 | 11.0 | 32.1 | 4.0 |
| Heat-shrinkage ratio in 90° C. hot water (%) | Longitudinal direction |  | 13.5 | 5.0 | 3.8 | 4.5 | 10.8 |
|  | Width direction |  | 26.8 | 65.0 | 55.3 | 58.7 | 23.5 |
| Irregularity of thickness in the width direction (%) | Width direction |  | 8.0 | 9.0 | 27.7 | 22.0 | 19.6 |
| Maximum heat shrinkage stress in 90° C. hot air (MPa) | Width direction |  | 17.3 | 16.0 | 6.3 | 5.3 | 7.1 |
| Haze (%) |  |  | 5.6 | 5.2 | 4.3 | 6.0 | 5.9 |
| Densty (g/cm$^3$) |  |  | 1.3497 | 1.3486 | 1.3401 | 1.2959 | 1.3463 |
| Degree of crystalinty (%) |  |  | 13.2 | 12.2 | 4.6 | — | 10.2 |
| Evaluation result of shrinkage finish property |  |  | 1 | 2 | 4 | 5 | 1 |

Despite using polyethylene terephthalate having a very low ratio of the amorphous component of 1 mol %/, in the heat-shrinkable films of Examples 1 to 6 which satisfy the requirements of the present invention, the heat-shrinkage ratio in the width direction was high, the irregularity of thickness in the width direction was reduced, the heat-shrinkage ratio in the longitudinal direction was also kept low, and the shrinkage finish property when covering as a label was also good (Evaluation 4 or 5).

In contrast, in Comparative Example 1, since the temperature T1 during preheating was low at 90° C., the heat-shrinkage ratio in the width direction at 90° C. was low at 26.8%, the shrinkage, finish property of the label was extremely deteriorated (Evaluation 1).

In Comparative Example 2, while the temperature Tri during preheating was controlled to be high temperature stipulated in the present invention, since the temperature T2 during first transverse stretching was low at 70° C., which was the same temperature as the temperature T3 during second transverse stretching, the heat-shrinkage ratio in the longitudinal direction at 70° C. was high at 16.0%, the shrinkage finish property of the label was deteriorated (Evaluation 2).

In Comparative Example 3, the temperature T1 during preheating, the temperature T2 during first transverse stretching, and the temperature T3 during second transverse stretching were all 80° C., the total stretch ratio was also low at 2.4 times, therefore the irregularity of thickness in the width direction was high at 27.7%.

In Comparative Example 4, since the polyester film containing a lot of amorphous component is used, the irregularity of thickness in the width direction was extremely high at 22.0%. In Comparative Example 4, since the amorphous raw material other than polyethylene terephthalate was used, the calculation method of degree of crystallinity determined by the above Equation 3 could not be applied, thus "-" is used in the column in Table 2.

In Comparative Example 5, the temperature T1 during preheating and the temperature T2 during first transverse stretching were controlled to the range stipulated in the present invention, the temperature T3 during second transverse stretching was high at 95° C., and this is an example of controlling at T2=T3. As a result, the heat-shrinkage ratio in the width direction at 90° C. was low at 23.5%, the shrinkage finish property of the label was extremely deteriorated (Evaluation 1.).

INDUSTRIAL APPLICABILITY

Since the heat-shrinkable polyester-based film of the present invention has the above-mentioned characteristics, it may be suitably used for labels for bottles or banding films used for banding lunch boxes or the like.

The invention claimed is:

1. A heat-shrinkable polyester-based film comprising ethylene terephthalate unit by 90 mol % or more out of whole ester unit 100 mol %, and having an amount of amorphous component of 1 mol % or less in 100 mol % of alcohol component, wherein the heat-shrinkable polyester-based film satisfies the following requirements (1) to (4):
   (1) heat-shrinkage ratio in a width direction measured by shrinking the heat-shrinkable polyester film for 10 seconds in 90° C. hot water is 50% or more and 75% or less,
   (2) heat-shrinkage ratio in a longitudinal direction measured by shrinking the heat-shrinkable polyester film for 10 seconds in 90° C. hot water is −6% or more and 14% or less,
   (3) heat-shrinkage ratio in the longitudinal direction measured by shrinking the heat-shrinkable polyester film for 10 seconds in 70° C. hot water is −6% or more and 6% or less, and (4) irregularity of thickness in the width direction is 1% or more and 20% or less.

2. The heat-shrinkable polyester-based film according to claim 1, further satisfying the following requirement (5):
   (5) maximum heat shrinkage stress in the width direction measured by shrinking the heat-shrinkable polyester film for 30 seconds in 90° C. hot air is 4 MPa or more and 13 MPa or less.

3. The heat-shrinkable polyester-based film according to claim 2, further satisfying the following requirement (6):
   (6) degree of crystallinity calculated from density is 1% or more and 15% or less.

4. The heat-shrinkable polyester-based film according to claim 1, further satisfying the following requirement (6):
   (6) degree of crystallinity calculated from density is 1% or more and 15% or less.

* * * * *